United States Patent [19]

Plecnik

[11] Patent Number: 5,588,461
[45] Date of Patent: Dec. 31, 1996

[54] HAZARDOUS MATERIAL CONTAINMENT SYSTEM

[75] Inventor: Joseph M. Plecnik, Long Beach, Calif.

[73] Assignee: Philipp Brothers Chemicals, Inc., N.J.

[21] Appl. No.: 225,376

[22] Filed: Apr. 8, 1994

[51] Int. Cl.⁶ .............................. B67D 5/32; G01M 3/18
[52] U.S. Cl. .......................... 137/312; 73/49.2; 73/49.3; 137/392; 141/94; 141/311 A
[58] Field of Search ..................................... 137/312, 386, 137/557, 558, 583, 587, 392; 73/46, 49.2, 49.3; 141/86, 94, 311 A; 220/469

[56] References Cited

U.S. PATENT DOCUMENTS

| | | | |
|---|---|---|---|
| 3,258,403 | 6/1966 | Malay | 137/312 |
| 3,320,969 | 5/1967 | Gordon | 137/312 |
| 3,889,707 | 6/1975 | Fay et al. | 137/312 |
| 4,685,327 | 8/1987 | Sharp | 220/469 |
| 4,834,137 | 5/1989 | Kawaguchi et al. | 137/312 |
| 4,895,272 | 1/1990 | DeBenedittis et al. | 137/312 |
| 4,925,046 | 5/1990 | Sharp | 220/469 |
| 4,939,833 | 7/1990 | Thomas | 137/312 |
| 4,947,888 | 8/1990 | Tanner | 137/312 |
| 5,046,354 | 9/1991 | Mungia et al. | 137/49.2 T |
| 5,086,804 | 2/1992 | Ngai | 137/312 |
| 5,096,087 | 3/1992 | Thomas | 137/312 |
| 5,259,895 | 11/1993 | Sharp | 220/469 |
| 5,316,035 | 5/1994 | Collins et al. | 137/312 |

FOREIGN PATENT DOCUMENTS

| | | | |
|---|---|---|---|
| 2719466 | 11/1978 | Germany | 137/312 |
| 3934057 | 11/1990 | Germany | 73/49.2 T |
| 4015821 | 11/1991 | Germany | 73/49.2 T |

*Primary Examiner*—George L. Walton
*Attorney, Agent, or Firm*—Bacon & Thomas

[57] ABSTRACT

A system is provided for containing material leaks which occur while a shipping container is being loaded or unloaded. The system includes portable dome that is placed on top of a shipping container, covering the container's inlet or outlet valves. If a leak is detected, the flow of material is stopped, and the leaked material is either absorbed or neutralized.

22 Claims, 3 Drawing Sheets

005,588,461

HAZARDOUS MATERIAL CONTAINMENT SYSTEM

BACKGROUND OF THE INVENTION

The present invention relates generally to hazardous material containment systems, and more particularly to an apparatus for containing a hazardous material as it is loaded into or unloaded from a bulk shipping container such as a tanker truck or a railroad tanker car.

The transportation and handling of hazardous materials, such as chlorine in its liquid or gaseous forms, presents many well known health and environmental dangers. Despite these dangers, many of the methods currently used to control such a leak are either prohibitively expensive, or ineffective in certain circumstances. As a result, the failures of systems associated with bulk shipping containers have produced many damaging hazardous material leaks.

One device currently used to control hazardous material leaks is an excess flow check valve. Such a valve stops material flow from a container when the flow rate is above a predetermined limit, known as the excess flow check valve set point. While excess flow check valves are effective in many circumstances, a large release can still occur if the flow rate of a leak is less than the excess flow check valve set point.

Another device used to control hazardous material leaks is a remotely mounted and activated shutoff valve. Such a valve may be used by itself, or in combination with one or more hazardous materials sensors. If a leak is detected, the sensors generate a signal causing the remote valve to close. A major drawback to this arrangement is that a leak may bypass a sensor location, and thus go undetected for some period of time. Also, there is no way to neutralize material released before the remote valve is closed.

Finally, the most effective of the prior techniques for controlling hazardous material leaks is the complete enclosure of a shipping container inside an environmentally sealed structure. Sensors and remote shutoff valves can be provided within the structure itself, allowing detection and complete containment of a hazardous material leak.

One of the drawbacks of such an arrangement is that in the event of a hazardous material release, the volume of air that must be controlled (absorbed or neutralized) is quite large. Therefore, neutralizing the leaked material requires a very large and expensive control system. Environmentally sealed structures are also quite expensive and immobile. Therefore, hazardous material users cannot always load or unload material into or from shipping containers in a safe manner.

SUMMARY OF THE INVENTION

Accordingly, an object of the present invention is to provide a portable apparatus for the containment of hazardous material leaks which occur as a shipping container is loaded or unloaded.

The present invention includes a removable dome placed over a shipping container's inlet or outlet valve, a means for maintaining a partial vacuum within the dome, a vacuum gauge, a hazardous material sensor, and a remotely controlled valve responsive to signals generated by the vacuum gauge and hazardous material sensor so that the flow of material can be stopped if a leak or loss of vacuum is detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to a preferred embodiment of the invention, which is a hazardous material containment system. An example of the preferred embodiment is illustrated in the accompanying drawings. In this description, gaseous and liquid $Cl_2$ is used as an example of a hazardous material controlled and contained by the present invention. While the invention will be described in conjunction with that preferred embodiment, it will be understood that it is not intended to limit the invention to one preferred embodiment, or to one specific hazardous material. On the contrary, it is intended to cover alternatives, modifications, and equivalents as may be included within the scope of the invention as defined by the appended claims.

Figure 1:
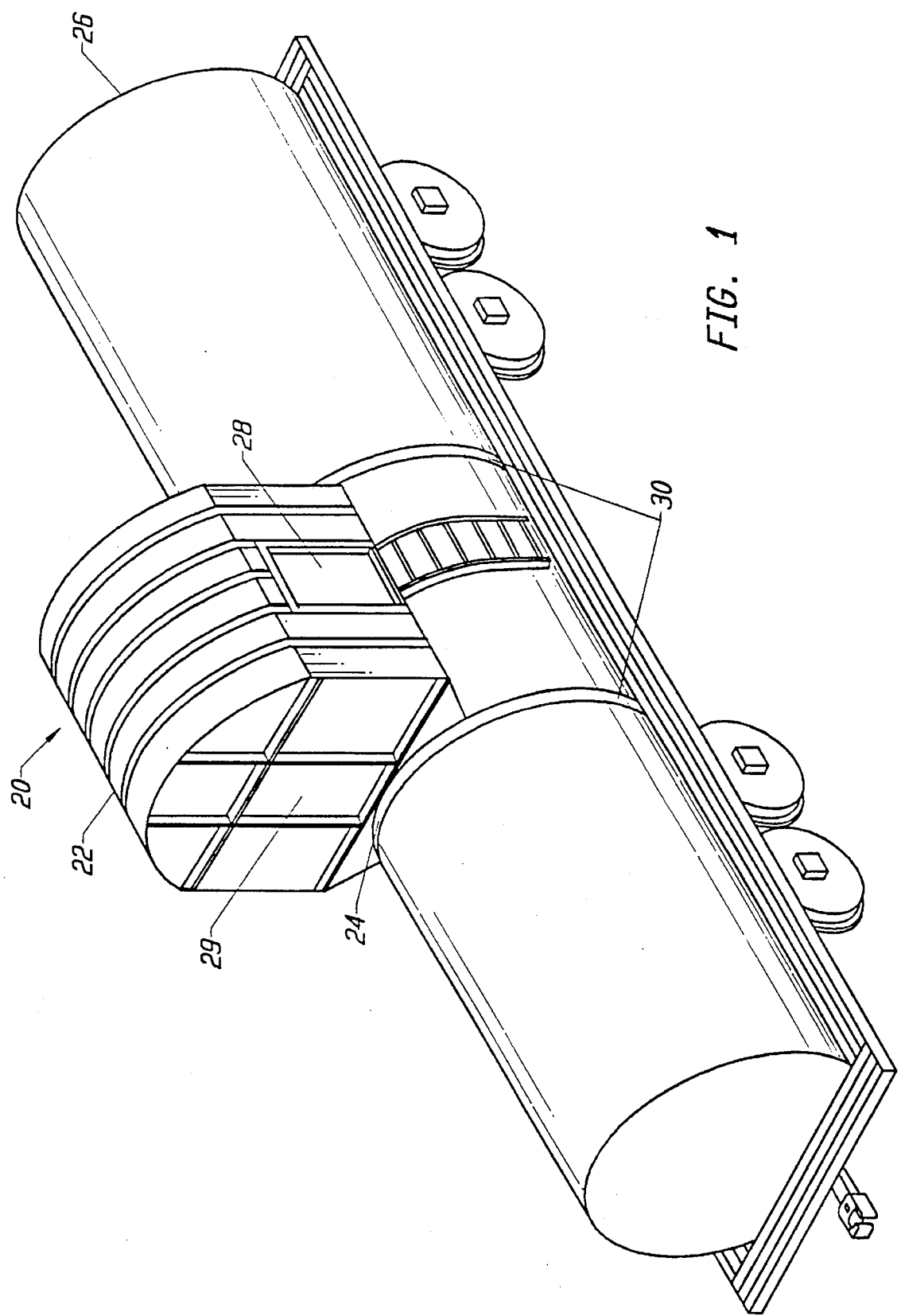
FIG. 1 is a perspective view showing one portion of the present invention as used with a railroad tanker car.

Referring now to the drawings, wherein like components are designated by like reference units, FIG. 1 is a perspective view showing a portion of a hazardous material containment system (HMCS) according to a preferred embodiment of the present invention. The HMCS is designated by general reference numeral 20.

In the preferred embodiment, HMCS 20 is in the form of a removable translucent fiberglass dome 22 having a bottom seal 24 designed to fit on a shipping container 26. Dome 22 may be held on shipping container 26 by straps 30, or by any other means for securing dome 22 to shipping container 26. Seal 24 and straps 30 create an air tight seal between dome 22 and shipping container 26.

Dome 22 also includes one or more doors 28, preferably made of self-sealing fabric, to allow access to the interior of dome 22. Dome 22 may also include one or more transparent windows 29, which allow the interior of dome 22 to be viewed. Preferably, windows 29 are made of a soft material that can be cut with a knife in the event of an emergency.

Figure 2:
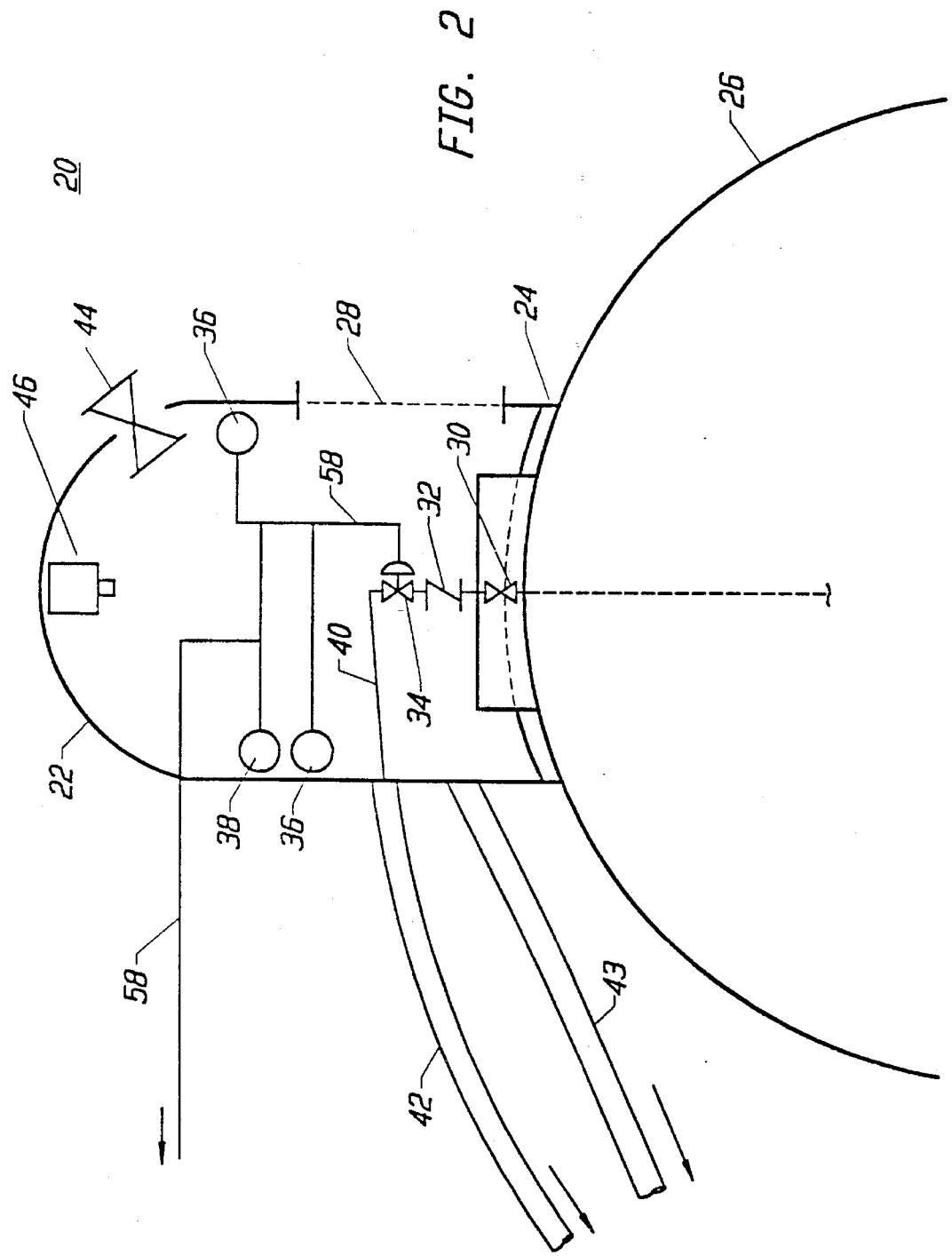
FIG. 2 is a schematic cross sectional view showing one portion of the present invention.

Referring now to FIG. 2, a schematic cross sectional view of HMCS 20 and shipping container 26 is shown. Shipping container 26 includes an angle valve 30 used to load or unload a hazardous material (such as $Cl_2$) into or from shipping container 26. Angle valve 30 is typically connected to an excess flow check valve 32, which is used to prevent rapid leaks from shipping container 26.

Dome 22 includes an automatic or remotely controlled shutoff valve 34 responsive to signals generated by one or more hazardous material sensors 36 or vacuum gauges 38 mounted within dome 22. Valve 34 may also be responsive to signals generated by other sources to be discussed further below. Sensors 36, gauges 38, and other signal sources are all coupled to valve 34 via signal bus 58. Dome 22 also includes an air inlet butterfly valve 44, and may include a television camera 46, which allows the interior of dome 22 to be viewed remotely.

During the unloading process, material flows from shipping container 26 through valves 30, 32, and 34, and into an internal flow pipe or hose 40. Material then flows away from dome 22 via an external flow pipe or hose 42. A vent hose 43 is also connected to dome 22. Vent hose 43 is used to partially evacuate the interior of dome 22, and to remove any leaked hazardous material vapors from the interior of dome 22.

Figure 3:
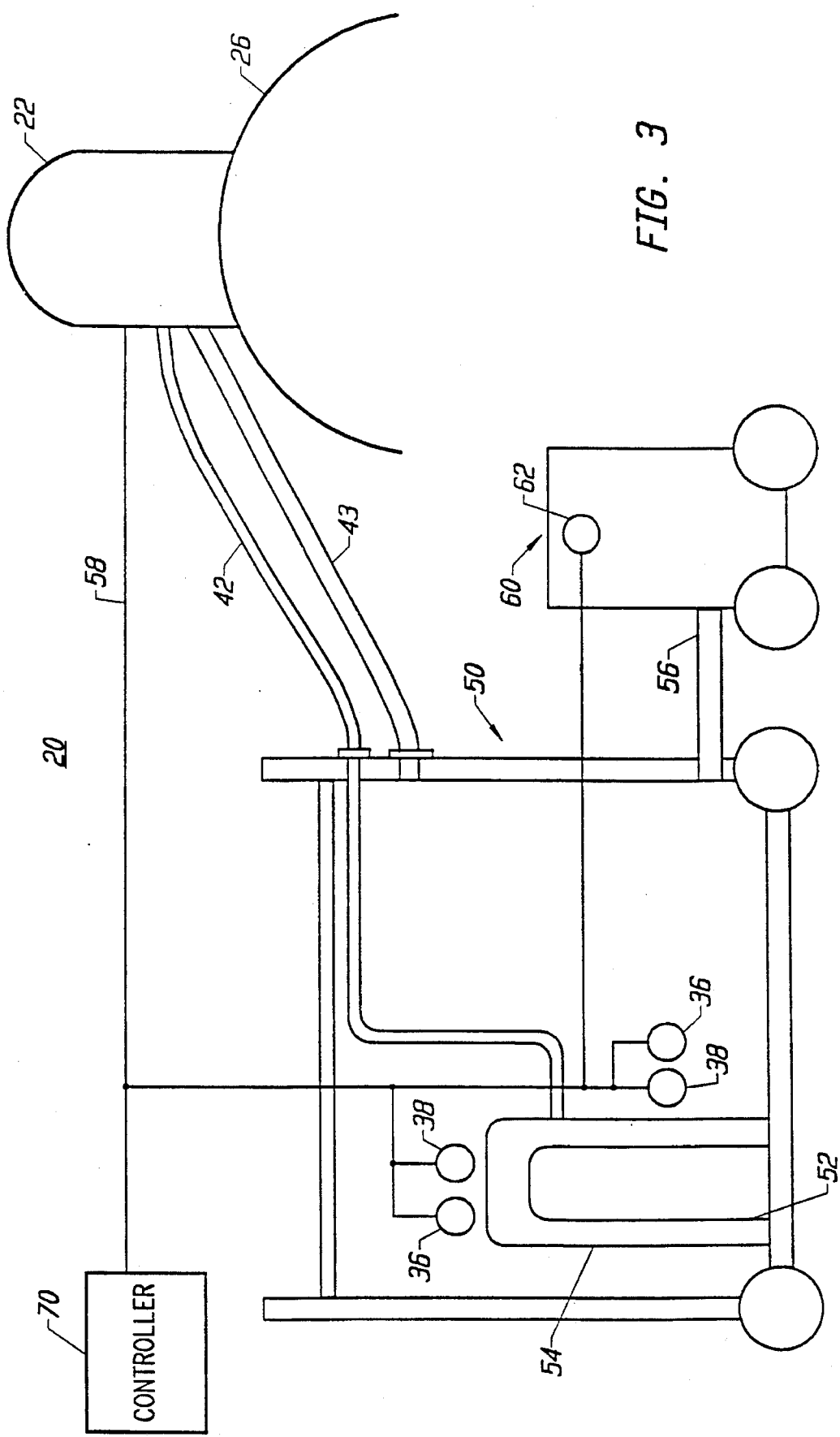
FIG. 3 is a schematic cross sectional view of the present invention as used with a separate evaporator and control device.

Referring now to FIG. 3, the use of dome 22 in combination with an environmentally sealed evaporator platform 50 and a control device such as a scrubber 60 is shown. Evaporator platform 50 is used to change $Cl_2$ from its liquid phase to its gas phase.

Material flows through external flow hose 42 and into an evaporator flow pipe or hose 48 within evaporator platform 50. Vent hose 43 is connected to the interior of evaporator platform 50, placing the interiors of platform 50 and dome 22 in vacuum communication.

Evaporator platform 50 includes an evaporator 52 and an evaporator container 54, both of which are well known to those skilled in the art. Also included inside platform 50 are one or more hazardous material sensors 36 and vacuum gauges 38. Sensors 36 and gauges 38 operate identically to those described above with respect to FIG. 2, and are also connected to signal bus 58.

A vent hose 56 is connected to the interior of platform 50, and is used to place the interior of platform 50 in vacuum communication with control device 60. In a preferred embodiment, control device 60 is a ferrous scrubber capable of absorbing $Cl_2$ gas.

Control device 60 operates under negative pressure, which creates a partial vacuum within evaporator platform 50 and dome 22. The maximum vacuum pressure provided by control device 60 is preferably 10 inches of water relative to the ambient pressure. By generating this vacuum, control device 60 pulls in any hazardous material vapors leaked in dome 22 or platform 50.

Control device 60 also includes a status monitor 62 which is coupled to signal bus 58. In the event of a failure or malfunction within control device 60, status monitor 62 will generate a control signal. This control signal is transmitted over signal bus 58 to valve 34 (see FIG. 2), and either causes valve 34 to close, or prevents valve 34 from opening.

A predetermined vacuum level must be maintained within dome 22 and platform 50 for valve 34 to be opened. Otherwise, one or more vacuum gauges 38 will generate a control signal, transmitted over signal bus 58, that will either close valve 34, or prevent valve 34 from opening.

Dome 22 allows for rapid leak detection because of the relatively small space enclosed by dome 22 and container 26. Any leaked material will rapidly reach a sensor 36 within either dome 22 or platform 50. Sensors 36 will then generate a control signal, transmitted over signal bus 58, that closes valve 34, as described above. This rapid response limits the volume of material leaked from container 26. Therefore, control device 60 need only be powerful enough to absorb or deactivate the largest amount of the hazardous material that could have escaped before valve 34 closes. Sensors 36 can be monitored either manually or automatically to determine when all of the escaped hazardous material has been removed. After the concentration of hazardous material has been reduced to acceptable levels, the source of the leak can be corrected.

The operation of dome 22, platform 50, and control device 60 may be controlled remotely through the use of a computing device or controller 70 such as a microcomputer or a dedicated microcontroller. HMCS 20 may also incorporate a visual and/or audible alarm system that indicates when a leak, loss of vacuum, or control device failure has occurred.

It will be understood by those skilled in the art that evaporator platform 50 need not be used during the operation of the present invention. For example, during the loading process, flow hose 42 may be directly connected to a source of liquid $Cl_2$, and vent hose 43 may directly connect control device 60 and dome 22. Also, an evaporator may not be needed when a hazardous material other than $Cl_2$ is being unloaded. However, HMCS 20 must always be used with control device 60 so that any leaked material may be absorbed or deactivated.

The present invention has been described in terms of a preferred embodiment. The invention, however, is not limited to the embodiment depicted and described. Rather, the scope of the invention is defined by the appended claims.

What is claimed is:

1. An apparatus for containing hazardous material leaks from a shipping container having a first valve allowing the hazardous material to flow into and out of said shipping container, said apparatus comprising:

a removable dome having an open bottom shaped to fit over a portion of said container that includes the first valve, said dome being adapted to be placed over said portion of said container during at least one of filling and discharging of hazardous material through said first valve;

sealing means for creating an air-tight seal between said dome and said container such that any leakage of hazardous material at said potion of said container will flow into said dome so as to prevent leakage of the hazardous material into a surrounding environment;

means, in vacuum communication with the interior of said dome, for maintaining at least a partial vacuum within said dome and for neutralizing said hazardous material;

first detector means, mounted within said dome, for detecting the presence of said hazardous material and for generating a first control signal in response thereto; and a remotely controlled shutoff valve connected to said first valve, said shut of valve being coupled to said first detector means and responsive to shutoff the flow of the hazardous material when said first control signal is generated due to a leakage of hazardous material into said dome.

2. The apparatus of claim 1 further including second detector means, mounted within said dome, for detecting a loss of said partial vacuum and for generating a second control signal in response thereto.

3. The apparatus of claim 2 wherein said shutoff valve is also responsive to shut off the flow of the hazardous material when said second control signal is generated.

4. The apparatus of claim 1 further including a hose, connected to said remotely controlled valve and extending through said dome, for directing the flow of said material between said shipping container and a second container external to said dome.

5. The apparatus of claim 4 wherein said second container is an evaporator.

6. The apparatus of claim 5 wherein said second container is mounted within an environmentally sealed third container.

7. The apparatus of claim 6 wherein said means for maintaining at least a partial vacuum within said dome and for neutralizing said hazardous material further includes means, in vacuum communication with the interior of said third container, for maintaining a partial vacuum within said third container.

8. The apparatus of claim 7 further including means, mounted within said third container and coupled to said remotely controlled valve, for detecting the presence of said hazardous material and for generating a third control signal in response thereto.

9. The apparatus of claim 8 wherein said shutoff valve is also responsive to shut off the flow of the hazardous material when said third control signal is generated.

10. The apparatus of claim 1 wherein said means for maintaining a partial vacuum within said dome and for neutralizing said hazardous material comprises a scrubber operating under negative pressure.

11. The apparatus of claim 10 wherein said scrubber further includes a means for generating a fourth control signal in response to a malfunction of said scrubber.

12. The apparatus of claim 11 wherein said shutoff valve is also responsive to shut off the flow of the hazardous material when said fourth control signal is generated.

13. The apparatus of claim 7 wherein said means for maintaining a partial vacuum within said third container comprises a scrubber operating under negative pressure.

14. The apparatus of claim 13 wherein said scrubber further includes a means for generating a fifth control signal in response to a malfunction of said scrubber.

15. The apparatus of claim 14 wherein said shutoff valve is also responsive to shut off the flow of the hazardous material when said fifth control signal is generated.

16. The apparatus of claim 1 wherein said dome is made of translucent material.

17. The apparatus of claim 16 wherein said translucent material is fiberglass.

18. The apparatus of claim 1 wherein said dome includes a door.

19. The apparatus of claim 18 wherein said door is made of self-sealing fabric.

20. The apparatus of claim 1 wherein said dome includes a transparent window.

21. The apparatus of claim 20 wherein said window can be cut with a knife.

22. The apparatus of claim 1 further including a television camera mounted within said dome.

* * * * *